Patented Nov. 3, 1942

2,300,607

UNITED STATES PATENT OFFICE 2,300,607

VULCANIZABLE POLYMERIZATION PRODUCT AND PROCESS OF PRODUCING SAME

Ewald Zaucker, Schkopau, Germany; vested in the Alien Property Custodian

No Drawing. Application April 3, 1940, Serial No. 327,635. In Germany April 1, 1939

6 Claims. (Cl. 260—36)

The present invention relates to a process of producing plasticized polymerization products capable of being vulcanized and the products obtained thereby.

Vulcanizable polymerization products of hydrocarbons having conjugated double linkages or of their interpolymerization products with other unsaturated compounds, such as styrene or acrylic nitrile, sometimes possess in insufficient plasticity by which the further processing of such products is rendered more difficult. While it is known that natural rubber may be rendered more plastic and capable of being more easily worked by subjecting it to a gentle oxidation, synthetic rubber-like polymerization products are liable to turn hard and brittle or glutinous under the influence of atmospheric oxygen thus losing their valuable properties.

Since oxygen or agents supplying oxygen detrimentally affect those synthetic products already at room temperature, an addition of so-called stabilizers is required to prevent or retard the aforesaid detrimental effects. When the polymerization products provided with such stabilizers are treated for plastification with oxygen or agents supplying oxygen, rather an intensive treatment is necessary in order to cause such stabilized products to be degraded into more plastic products.

I have now found that vulcanizable polymerization products may be plasticized under considerably milder conditions by treating them with oxygen or agents supplying oxygen in the presence as stabilizers of amines and of phenols, at least one nuclear hydrogen atom of which is replaced by a hydrocarbon radicle which radicle itself may be substituted by a hydroxyl group. Phenols of the said kind are, for example, o-cresol, p-cresol, thymol, p-isobutylphenol, p-isooctylphenol, dodecyl-phenol, p-cyclohexylphenol, o-benzylphenol or p-benzylphenol (2- or 4-hydroxydiphenyl-methane), beta-naphthol, tetrahydro-β-naphthol and 2.2'-dihydroxydiphenyl. These phenols may be added either directly after the polymerization or while the polymerization products are being worked up or further processed, for example by adding their alkaline solution or suspension to the aqueous dispersion of the polymerization product, by spraying their solution upon the finely distributed polymerization product or by mixing them in on the mixing roller.

Among suitable stabilizing amines I may mention primary, secondary, or tertiary mono- or polyamines, for example dimethylaniline, 2-dimethylaminonaphthalene, 2-phenyl-aminonaphthalene, 4'-tolyl-1-naphthylamine, 2.2'-dinaphthylamine, 2.7-naphthylenediamine or 1.4-di-beta-naphthylaminobenzene. In the case of polymerization products very sensitive to oxygen the amines are preferably added already before the polymerization, if they will not hamper the same, or directly after its completion. The amines may be added either together with the phenols or separately, in concentrated form or in solution or suspension, as the state of the polymerization products may require, i. e. whether this be in compact or emulsified or dissolved state.

The treatment of the polymerization products to which the said amines and phenols have been added, with oxygen or agents supplying oxygen is preferably carried out at elevated temperature and, according to the intensity of action, leads to products of more or less increased plasticity. Whereas in the case of a thorough mixing in of an agent supplying oxygen, the compactness and shape of the polymerization product are of little importance, a large superficial area has to be provided for (for example by dissolution, emulsification, drawing out into thin sheets or grinding) when the plastification is carried out with air or an aqueous medium supplying oxygen, as for example solutions of hydrogen peroxide or persalts. It is essential in this treatment that the contact between the polymerization product and the medium yielding oxygen should be so intimate that sufficient oxygen be available also inside the polymerization products.

In this manner polymerization products which are difficult to work may be transformed into products of good plasticity and which may be worked with greater ease. The process according to my invention not only results in a considerable economy of time and power in the plastification of polymerization products, but also allows of transforming the plasticized polymerization products, by the good incorporation and distribution of the additions, into vulcanizates which are superior in quality to those hitherto obtained.

The following example serves to illustrate how my present invention may be carried out in practice, but the invention is not restricted to the said example. The parts are by weight.

*Example*

A 3 per cent solution of phenyl-β-naphthylamine in benzene is added to an aqueous dispersion of an interpolymerization product from 75 parts of butadiene and 25 parts of styrene obtained by emulsion-polymerization. The polymerization product obtained therefrom by coagulation is incorporated on the mixing roller with 2 per cent of one of the phenols set out below. The mixture is reduced by grinding to a crumbly state and then treated with compressed air at 3.5 atm. and at 130° C. for 70 and 100 minutes, respectively. The degree of plasticity obtained in this way is ascertained by measuring the viscosity of a solution of the treated product in benzene. The plasticity is the greater, the lesser its viscosity measured in centipoise (c. p.) The following results were obtained:

| Addition | Viscosity after a treatment of— | |
|---|---|---|
| | 70 minutes | 100 minutes |
| | Centipoises | Centipoises |
| 4-isooctylphenol | 12.2 | 10.3 |
| 4-cyclohexylphenol | 11.9 | 11.9 |
| 2-benzylphenol | | 11.9 |
| 4-benzylphenol | | 7.8 |
| 2.2'-dihydroxydiphenyl | 15.0 | |

The same polymerization product added with phenyl-$\beta$-naphthylamine alone is insoluble but strongly swellable in benzene. By heating it in compressed air at 3.5 atm. and at 130° C. for 100 minutes it does not become soluble. By heating it in compressed air at 140° C. after 100 minutes a viscosity of 186 c. p. and after 160 minutes a viscosity of 105.9 c. p. is obtained.

What I claim is:

1. Process of plasticizing synthetic rubber resulting from the emulsion polymerization of an open chain diolefine which comprises subjecting the synthetic rubber to an oxidizing treatment in the presence of an aromatic stabilizing agent containing an amino group and selected from the class consisting of dimethylaniline, 2-dimethylaminonaphthalene, 2-phenylaminonaphthalene, 4'-tolyl-1-naphthylamine, 2.2'-dinaphthylamine, 2.7-naphthylene diamine and 1.4-di-$\beta$-naphthylamino benzene and of a phenol at least one nuclear hydrogen atom of which is substituted by a radicle selected from the group consisting of hydrocarbon radicles and hydroxy-substituted hydrocarbon radicles, the phenol being otherwise unsubstituted.

2. The process of plasticizing synthetic rubber resulting from the emulsion polymerization of a mixture of an open chain diolefine and another organic compound polymerizable under the same conditions, which comprises subjecting the synthetic rubber to an oxidizing treatment in the presence of an aromatic stabilizing agent containing an amino group and selected from the class consisting of dimethylaniline, 2-dimethylaminonaphthalene, 2-phenylaminonaphthalene, 4'-tolyl-1-naphthylamine, 2.2'-dinaphthylamine, 2.7-naphthylene diamine and 1.4-di-$\beta$-naphthylamino benzene and of a phenol at least one nuclear hydrogen atom of which is substituted by a radicle selected from the group consisting of hydrocarbon radicles and hydroxy-substituted hydrocarbon radicles, the phenol being otherwise unsubstituted.

3. The process of plasticizing synthetic rubber resulting from the emulsion polymerization of butadiene and styrene which comprises subjecting the synthetic rubber to an oxidizing treatment in the presence of an aromatic stabilizing agent containing an amino group and selected from the class consisting of dimethylaniline, 2-dimethylaminonaphthalene, 2-phenylaminonaphthalene, 4'-tolyl-1-naphthylamine, 2.2'-dinaphthlamine, 2.7-naphthylene diamine and 1.4-di-$\beta$-naphthylamino benzene and of a phenol at least one nuclear hydrogen atom of which is substituted by a radicle selected from the group consisting of hydrocarbon radicles and hydroxy-substituted hydrocarbon radicles, the phenol being otherwise unsubstituted.

4. Synthetic rubber resulting from the emulsion polymerization of an open chain diolefine, plasticized by an oxidizing treatment in the presence of an aromatic stabilizing agent containing an amino group and selected from the class consisting of dimethylaniline, 2-dimethylaminonaphthalene, 2-phenylaminonaphthalene, 4'-tolyl-1-naphthylamine, 2.2'-dinaphthylamine, 2.7-naphthylene diamine and 1.4-di-$\beta$-naphthylamino benzene and of a phenol at least one nuclear hydrogen atom of which is substituted by a radicle selected from the group consisting of hydrocarbon radicles and hydroxy-substituted hydrocarbon radicles, the phenol being otherwise unsubstituted.

5. Synthetic rubber resulting from the emulsion polymerization of a mixture of an open chain diolefine and another organic compound polymerizable under the same conditions plasticized by an oxidizing treatment in the presence of an aromatic stabilizing agent containing an amino group selected from the class consisting of dimethylaniline, 2-dimethylaminonaphthalene, 2-phenylaminonaphthalene, 4'-tolyl-1-naphthylamine, 2.2'-dinaphthylamine, 2.7-naphthylene diamine and 1.4-di-$\beta$-naphthylamino benzene and of a phenol at least one nuclear hydrogen atom of which is substituted by a radicle selected from the group consisting of hydrocarbon radicles and hydroxy-substituted hydrocarbon radicles, the phenol being otherwise unsubstituted.

6. Synthetic rubber resulting from the emulsion polymerization of butadiene and styrene, plasticized by an oxidizing treatment in the presence of an aromatic stabilizing agent containing an amino group and selected from the class consisting of dimethylaniline, 2-dimethylaminonaphthalene, 2-phenylaminonaphthalene, 4'-tolyl-1-naphthylamine, 2.2'-dinaphthylamine, 2.7-naphthylene diamine and 1.4-di-$\beta$-naphthylamino benzene and of a phenol at least one nuclear hydrogen atom of which is substituted by a radicle selected from the group consisting of hydrocarbon radicles and hydroxy-substituted hydrocarbon radicles, the phenol being otherwise unsubstituted.

EWALD ZAUCKER.